US 9,005,565 B2

(12) United States Patent
Jahangiri-Famenini (10) Patent No.: US 9,005,565 B2
(45) Date of Patent: Apr. 14, 2015

(54) METHOD AND APPARATUS FOR FORMING GRAPHENE

(71) Applicant: Hamid-Reza Jahangiri-Famenini, Toronto (CA)

(72) Inventor: Hamid-Reza Jahangiri-Famenini, Toronto (CA)

( * ) Notice: Subject to any disclaimer, the term of this patent is extended or adjusted under 35 U.S.C. 154(b) by 0 days.

(21) Appl. No.: 14/230,632

(22) Filed: Mar. 31, 2014

(65) Prior Publication Data

US 2014/0212596 A1 Jul. 31, 2014

Related U.S. Application Data

(63) Continuation-in-part of application No. 13/134,217, filed on Jun. 2, 2011.

(60) Provisional application No. 61/398,332, filed on Jun. 24, 2010.

(51) Int. Cl.
*C01B 31/04* (2006.01)
*B82Y 30/00* (2011.01)
*B82Y 40/00* (2011.01)

(52) U.S. Cl.
CPC ............ *C01B 31/0446* (2013.01); *B82Y 30/00* (2013.01); *B82Y 40/00* (2013.01)

(58) Field of Classification Search
USPC ........... 423/448; 427/551, 228, 555, 553, 554
See application file for complete search history.

(56) References Cited

U.S. PATENT DOCUMENTS

2010/0209330 A1* 8/2010 Golzhauser et al. .......... 423/448

FOREIGN PATENT DOCUMENTS

WO    WO 2009/030473    *  3/2009    .............. C01B 31/04

* cited by examiner

*Primary Examiner* — Daniel C McCracken (57) ABSTRACT

A method of forming graphene comprises supplying energy to at least a portion of an organic material monolayer disposed on a substrate. The energy is sufficient to carbonize the at least a portion of the monolayer exposed thereto to form a layer of graphene on the substrate.

13 Claims, 6 Drawing Sheets

METHOD AND APPARATUS FOR FORMING GRAPHENE

CROSS-REFERENCE TO RELATED APPLICATIONS

This application is a continuation-in-part of U.S. application Ser. No. 13/134,217 filed on Jun. 2, 2011, which claims the benefit of U.S. Application No. 61/398,332 filed on Jun. 24, 2010, the contents of which are incorporated herein by reference in their entireties.

FIELD OF THE INVENTION

The present invention relates generally to thin film fabrication and in particular, to a method and apparatus for forming graphene.

BACKGROUND OF THE INVENTION

First discovered in 2004, graphene is a one-atom-thick planar sheet of sp2-bonded carbon atoms that are densely packed in a honeycomb crystal lattice. In other words, it consists of a two-dimensional, giant, flat molecule made up of a lattice of carbon atoms, arranged in hexagons, which is only the thickness of an atom.

Graphene was initially obtained by mechanical exfoliation of graphite, using "the sticky-tape method" to repeatedly split graphite crystals into increasingly thinner pieces.

Various other methods for producing graphene have been used such as evaporating a mixture of large carbon-containing molecules and firing it over a heated metal surface such as extremely thin pieces of nickel, followed by dissolving away the nickel with chemicals, then "mounting" the carbonized residue (that may contain graphene) on a flexible polymer.

The various methods of producing graphene that have been published to this date have been useful for small scale production and therefore employed for research purposes only, as the said methods are cumbersome and/or complicated.

Graphene possesses many unique properties, such as: being transparent, having remarkable mechanical strength, being bendable and foldable while still retaining its properties, being an excellent conductor of electricity.

Due to its unique electronic properties, graphene may be used to fabricate ultra-fast graphene transistors that operate at GHz or near terahertz frequencies while using less energy compared to the currently available transistors as well as being able to operate at room temperature.

The high electrical conductivity and high optical transparency of graphene make it a candidate for transparent conducting electrodes, required for such applications as touch-screens, liquid crystal displays, organic photovoltaic cells, and organic light-emitting diodes.

Other areas where graphene may be used include: "detection technology" and in the conductive plates of ultracapacitors.

It is therefore an object of the present invention at least to provide a novel apparatus and method for fabricating graphene.

SUMMARY OF THE INVENTION

Accordingly, in one aspect, there is provided a method of forming graphene, comprising: supplying energy to at least a portion of an organic material monolayer disposed on a substrate, the energy being sufficient to carbonize the at least a portion of the monolayer exposed thereto to form a layer of graphene on the substrate.

The energy may be a localized beam of energy. The localized beam of energy may be any of a laser beam, a maser beam, and an electron beam. The method may further comprise: moving the localized beam over the organic material monolayer in accordance with a pattern.

The substrate may comprise a plate. The plate may comprise a planar surface. The plate may comprise a surface having a non-planar topography formed by one or more of etching and deposition. The plate may comprise at least one internal conduit for conducting fluid therethrough for any of heating and cooling the plate. The plate may have a surface coating for modifying surface properties of the substrate, the organic material monolayer being disposed on the surface coating.

The substrate may be a liquid surface of a liquid volume. The method may further comprise, after the supplying, transferring the layer of graphene from the liquid surface of the liquid volume onto a second substrate. The organic material monolayer may further comprise a dopant, and wherein the supplying comprises forming a layer of doped graphene on the liquid surface. The energy may be a localized beam of energy. The method may further comprise: moving the localized beam over the organic material monolayer in accordance with a pattern.

The organic material monolayer may be in either a solid state or a liquid state.

The organic material monolayer may further comprise a dopant, and wherein the supplying comprises forming a layer of doped graphene on the substrate.

The method may further comprise one or more of: (i) cooling the substrate during the supplying, and (ii) placing the substrate in an environment having an elevated atmospheric pressure, to reduce evaporation of the organic material monolayer during carbonization. The method may further comprise a combination of cooling the substrate and placing the substrate in the environment having the elevated atmospheric pressure during the supplying.

The method may further comprise, after the supplying, removing an uncarbonized portion of the organic material monolayer.

The energy may be thermal energy supplied by a hot plate, or by a heating element of any of a furnace, a kiln, and an oven. The substrate may be a first substrate, the organic material monolayer being arranged in a sandwich configuration between the first substrate and a second substrate.

In another aspect, there is provided an apparatus for forming graphene, the apparatus comprising: a substrate on which an organic material monolayer is disposed; and an energy source configured to supply sufficient energy to at least a portion of the organic material monolayer, the energy being sufficient to carbonize the at least a portion of the monolayer exposed thereto to form a layer of graphene on the substrate. The energy source may be configured to supply a localized beam of energy. The energy source may be any of a laser, a maser, and an electron beam source. The apparatus may further comprise: a movement controller coupled to the energy source, the movement controller being configured to scan the localized beam of energy over the organic material monolayer in accordance with a pattern.

The substrate may comprise a plate. The plate may comprise a planar surface. The plate may comprise a surface having a non-planar topography formed by one or more of etching and deposition. The plate may comprise at least one internal conduit for conducting fluid therethrough for any of heating and cooling the plate. The plate may further comprise a surface coating for modifying surface properties of the substrate, the organic material monolayer being disposed on the surface coating.

The apparatus may further comprise a vessel for containing a liquid volume, wherein the substrate is a liquid surface of the liquid volume. The vessel may be configured for allowing the liquid volume to be drained, for transferring the layer of graphene from the liquid surface of the liquid volume onto a second substrate. The energy source may be configured to supply a localized beam of energy. The apparatus may further comprise: a movement controller coupled to the energy source, the movement controller being configured to scan the localized beam of energy over the organic material monolayer in accordance with a pattern. The apparatus may further comprise a pressure vessel in which the substrate is contained, the pressure vessel being configured for providing an elevated atmospheric pressure for reducing evaporation of the organic material monolayer during carbonization. The pressure vessel may be configured to be cooled, for reducing evaporation of the organic material monolayer during carbonization. The apparatus may further comprise a refrigerated chamber in which the substrate is contained, the refrigerated chamber being configured for cooling the organic material monolayer for reducing evaporation thereof during carbonization.

The energy source may be a hot plate, or a heating element of any of a furnace, a kiln, and an oven. The substrate may be a first substrate, and the organic material monolayer is arranged in a sandwich configuration between the first substrate and a second substrate.

BRIEF DESCRIPTION OF THE DRAWINGS

Embodiments will now be described more fully with reference to the accompanying drawings in which.

DETAILED DESCRIPTION OF THE EMBODIMENTS

Figure 1:
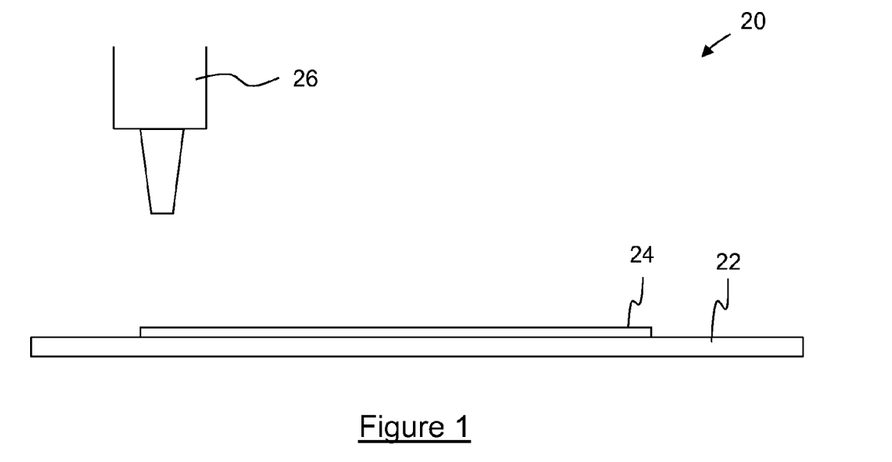
FIG. 1 is a schematic side view of a portion of an apparatus for fabricating graphene.
Figure 2:
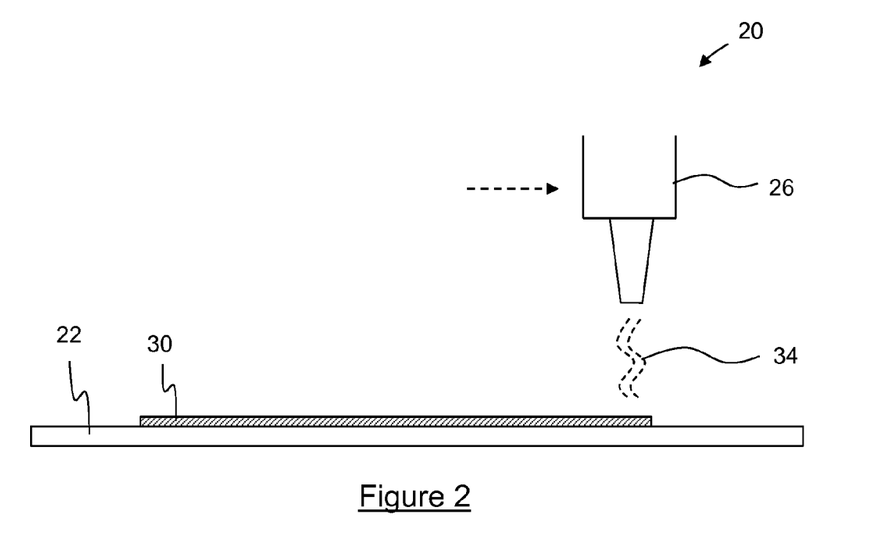
FIG. 2 is a schematic side view of the portion of the apparatus of FIG. 1, during use.

Turning now to FIGS. 1 and 2, a portion of an apparatus for forming graphene is shown, and is generally indicated by reference numeral 20. Apparatus 20 comprises a substrate 22 on which an organic material monolayer 24 is disposed. In this embodiment, the substrate 22 has a generally planar shape, and is in the form of a plate.

The apparatus 20 further comprises an energy source 26 that is configured to supply sufficient energy to the organic material monolayer 24 for carbonizing at least a portion of the organic material monolayer so as to form a graphene layer 30. Here, it will be understood that carbonizing refers to conversion of the exposed organic material within the organic material monolayer 24 into a monolayer of solid carbon, and specifically a monolayer of graphene, by pyrolysis upon exposure to the supplied energy.

In the embodiment shown, the energy source 26 is configured to provide localized energy in the form of an energy beam 34. The energy beam 34 is spatially localized, such that at any given time the energy beam 34 only exposes an area or "spot" having a diameter that is generally commensurate with the width of the energy beam 34. Accordingly, only the portion of the organic material monolayer 24 that is directly exposed to the energy beam 34 is carbonized, while surrounding portions of the organic material monolayer 24 that are not exposed, or have not yet been exposed, are not carbonized. In this embodiment, the energy source 26 is a laser, and the energy beam 34 is a laser beam.

The energy source 26 is coupled to a movement controller (not shown) that is in communication with a general purpose computing device (not shown). The general purpose computing device is configured to operate the movement controller according to a program stored in memory thereof, so as to scan the energy beam 34 over the organic material monolayer 24 to form the graphene layer. The stored program comprises a pattern and, due to the localized nature of the energy beam 34, movement of the energy beam 34 over the organic material monolayer 24 in accordance with the program forms a graphene layer having a pattern corresponding with the pattern of the stored program. In the example shown, the pattern covers the entire area of the organic material monolayer 24, such that the entirety of the organic material monolayer 24 is carbonized to form the graphene layer 30 during execution of the program.

During use, the organic material monolayer 24 is disposed on the substrate 22. In this embodiment, the organic material monolayer 24 is disposed on the substrate 22 in a generally arbitrary shape, and the pattern is a rectangular pattern. Upon execution of the program, the general purpose computing device operates the movement controller to position the energy beam 34 spot at a point within the organic material monolayer 24 so as to define a first corner, and to scan the energy beam 34 spot along a first straight line toward a point defining a second corner, thereby carbonizing the organic material present along the first straight line. Upon reaching the second corner, the general purpose computing device operates the movement controller to scan the energy beam 34 spot by a distance equal to about the width of the energy beam 34 along an inward direction from the first side of the organic material monolayer 24, and to scan the energy beam 34 spot along a second straight line parallel to the first straight line and such that a portion of the second straight line overlaps the first straight line, thereby carbonizing the organic material present on the second straight line. The general purpose computing device continues to operate the controller to scan the energy beam 34 spot in a similar manner over the remainder of the organic material monolayer 24, so as to carbonize the organic material present in the remainder of the organic material monolayer 24.

It will be understood that other patterns may be used. For example, although in the embodiment described above, the general purpose computing device operates the movement controller to scan the energy beam spot from the second corner along a second straight line parallel to the first straight line and such that a portion of the second straight line overlaps the first straight line, in other embodiments, the general purpose computing device may alternatively operate the movement controller to scan the energy beam spot along a second straight line from the second corner toward a point defining a third corner, and in turn to a point defining a fourth corner, and then to a point adjacent the first corner, and so forth, so as to operate the movement controller to scan the energy beam spot in a continuously decreasing periphery, such that the energy beam spot is moved "inwardly" with respect to the pattern until the entirety of the organic material monolayer is carbonized to form the graphene layer. In another embodiment, the general purpose computing device may alternatively operate the movement controller to scan the energy beam spot beginning at the center of the organic material monolayer, or at another point within the organic material monolayer, and moving "outwardly" with respect to the pattern, until the entirety of the organic material monolayer is carbonized to form the graphene layer. It will also be understood that the pattern need not be limited to a rectangular pattern and in other embodiments, the pattern may alternatively be of another shape, such as for example a square, circle, oval, and the like, or any other regular polygon, or an irregular shape.

Although in the embodiment described above, the pattern covers the entire area of the organic material monolayer, such that the entirety of the organic material monolayer is carbonized to form the graphene layer during execution of the program, in other embodiments, the pattern may alternatively not cover the entire area of the organic material monolayer. For example, the pattern may alternatively cover only a portion of the organic material monolayer, such that only the portion of the organic material monolayer exposed to the energy beam within the pattern is carbonized to form the graphene layer upon execution of the pattern. In one such embodiment, the unexposed organic material monolayer, and namely the portion of the organic material monolayer not exposed to the energy beam, may be selectively removed subsequent to exposure to the energy beam, such that only the carbonized layer remains on the substrate. The unexposed organic material monolayer may be selectively removed by any of, for example, dissolution by solvent, etching, and the like. In such embodiments, the pattern may for example be an electronic circuit pattern for forming a layer of graphene as part of an electronic circuit.

Although in the embodiment described above, the energy source is a laser and the energy beam is a laser beam, in other embodiments, the energy source may alternatively be any suitable source of energy configured to provide an energy beam of sufficiently high energy capable of carbonizing at least a portion of the organic material monolayer exposed thereto so as to form the graphene layer. For example, the energy source may alternatively be an electron beam source, and the energy beam may alternatively be an electron beam. As another example, the energy source may alternatively be a maser, and the energy beam may alternatively be a maser beam.

Although in the embodiment described above, the energy source is configured to provide localized energy in the form of an energy beam, in other embodiments, the energy source may alternatively be configured to provide energy over a large spatial area. For example, in one such embodiment, the energy source may alternatively be a heating element, or a device comprising a heating element, such as for example a hot plate, or a flame, and the like.

Figure 3A:
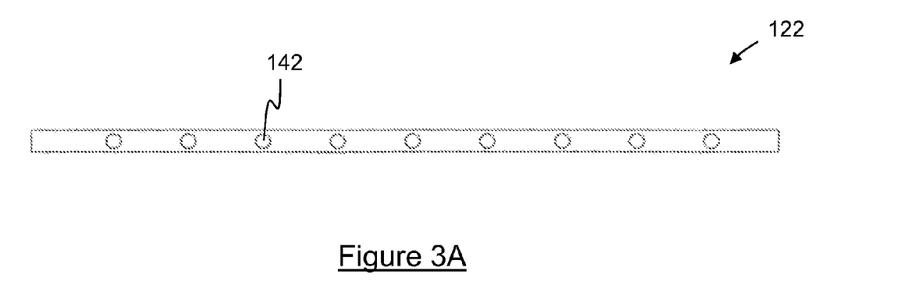
FIG. 3A is a sectional side view of an embodiment of a substrate for use with the apparatus of FIG. 1.
Figure 3B:
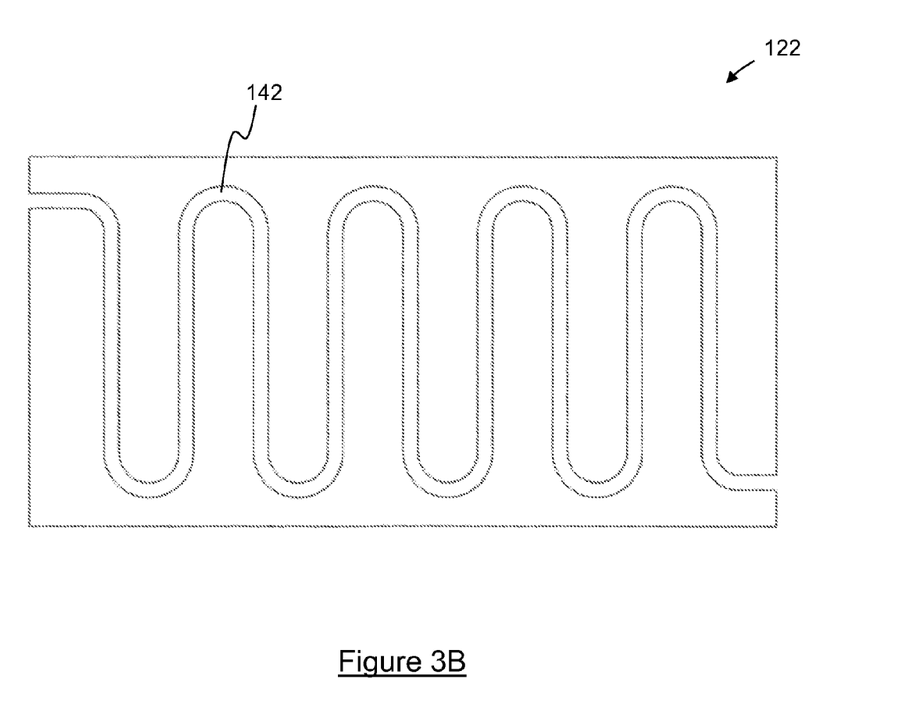
FIG. 3B is a sectional top view of the substrate of FIG. 3A.

The substrate is not limited to the substrate described above, and in other embodiments, other substrates may alternatively be used. For example, FIGS. 3A and 3B show another embodiment of a substrate for use with the apparatus 20 described above, and which is generally indicated by reference numeral 122. Substrate 122 has a generally planar shape, and is in the form of a plate having an internal conduit 142 for conducting fluid therethrough. In this embodiment, the fluid conducted through the internal conduit 142 is chilled fluid for cooling the substrate 122 and the organic material monolayer (not shown) disposed thereon. As will be understood, by cooling the substrate 122 and the organic material monolayer disposed thereon, evaporation of the organic material monolayer during exposure to the energy beam (not shown) is reduced or eliminated.

Although in the embodiment described above, the apparatus comprises a substrate configured to be cooled for reducing or eliminating evaporation of the organic material monolayer during exposure to the energy beam, in other embodiments, other configurations may alternatively be used for reducing or eliminating evaporation. For example, in one embodiment, the apparatus may alternatively be placed in a cooled environment, such as for example in a refrigerator or in a refrigerated chamber, so as to cool the organic material monolayer to reduce or eliminate evaporation. In another embodiment, a cooled fluid, such as for example liquid nitrogen, may alternatively be delivered to the organic material monolayer at and/or near the energy beam spot during exposure, so as to reduce or eliminate evaporation. As will be understood, liquid nitrogen is advantageous as a cooling fluid as it would not be converted into graphene during carbonization. In another embodiment, the substrate having the organic material monolayer disposed thereon may alternatively be immersed in a volume of liquid nitrogen, so as to cool the organic material monolayer to reduce or eliminate evaporation. In still another embodiment, the apparatus may alternatively be placed in an environment having an elevated atmospheric pressure, such as for example in a suitably configured pressure vessel, so as to reduce or eliminate evaporation of the organic material monolayer during exposure to the energy beam. It will be understood that, in still other embodiments, a combination of cooling and elevated atmospheric pressure may alternatively be used to reduce or eliminate evaporation of the organic material monolayer during exposure to the energy beam. For example, any of the substrate configured to be cooled, the placement of the apparatus in a cooled environment, the delivery of cooled fluid, and the immersion of the substrate in a volume of liquid nitrogen, all of which are described above, may alternatively be used in combination with placement of the apparatus in an environment having an elevated pressure.

Figure 4:
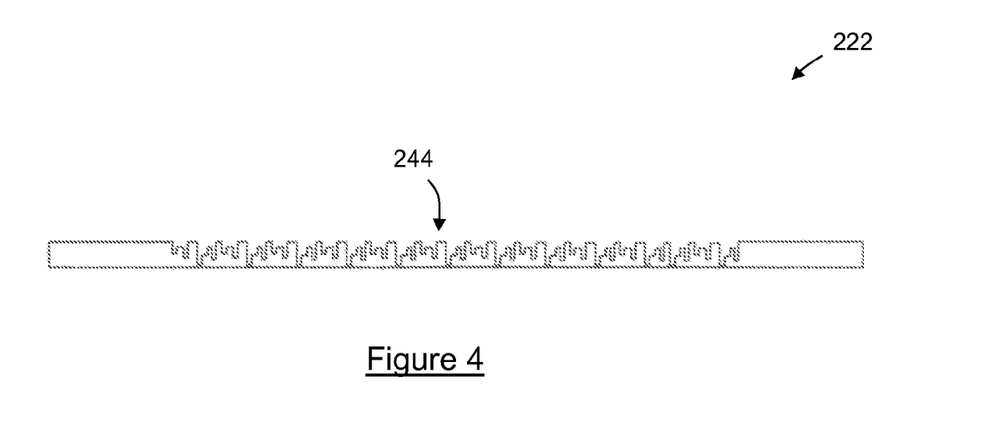
FIG. 4 is a sectional side view of another embodiment of a substrate for use with the apparatus of FIG. 1.

Other substrates may alternatively be used. For example, FIG. 4 shows another embodiment of a substrate for use with the apparatus described above, and which is generally indicated by reference numeral 222. Substrate 222 has a generally planar shape, and comprises a non-planar surface 244 having a surface topography. In this embodiment, the surface topography is formed by deposition of a material, and by subsequent etching of the deposited material. As will be understood, during use, the organic material monolayer (not shown) generally conforms to the surface topography of the non-planar surface 244 when it is disposed thereon, and carbonization of the organic material monolayer results in the formation of a graphene layer on the non-planar surface 244.

Figure 5:
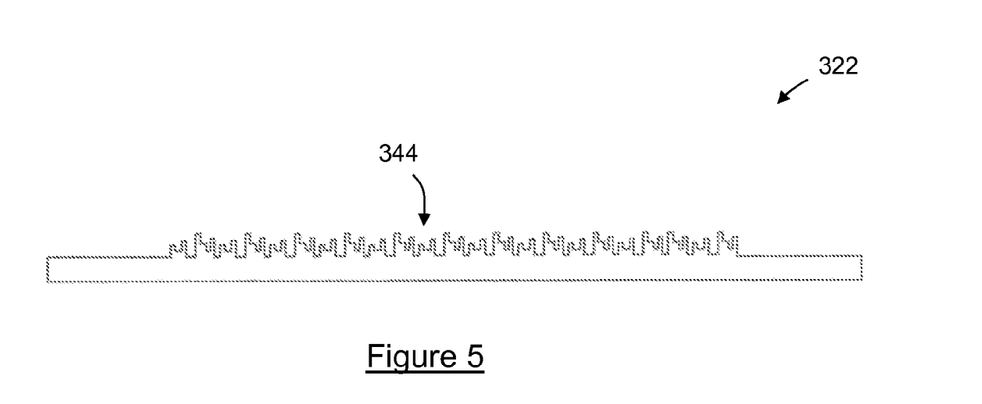
FIG. 5 is a sectional side view of still another embodiment of a substrate for use with the apparatus of FIG. 1.

Still other substrates may alternatively be used. For example, FIG. 5 shows another embodiment of a substrate for use with the apparatus described above, and which is generally indicated by reference numeral 322. Substrate 322 has a generally planar shape, and comprises a non-planar surface 344 having a surface topography. In this embodiment, the surface topography is formed by etching of the substrate material. As will be understood, during use, the organic material monolayer (not shown) generally conforms to the surface topography of the non-planar surface 344 when it is disposed thereon, and carbonization of the organic material monolayer results in the formation of a graphene layer on the non-planar surface 344.

Figure 6:
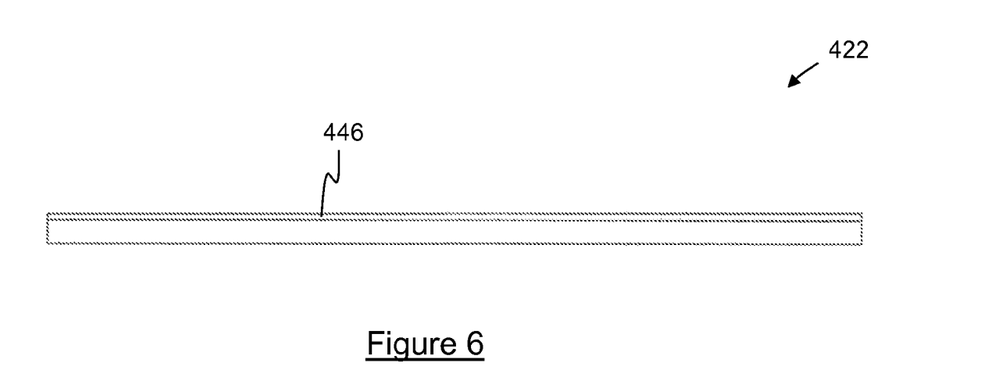
FIG. 6 is a sectional side view of still another embodiment of a substrate for use with the apparatus of FIG. 1.

Still other substrates may alternatively be used. For example, FIG. 6 shows another embodiment of a substrate for use with the apparatus described above, and which is generally indicated by reference numeral 422. Substrate 422 has a generally planar shape, and further comprises a surface coating 446 fabricated of a second material, where the second material is a different material from the substrate material. As will be understood, the surface coating 446 allows the surface properties of the substrate to be modified. During use, the organic material monolayer (not shown) generally is disposed on the surface coating 446, and is exposed to the energy beam for carbonizing at least a portion of the organic material monolayer so as to form a layer of graphene thereon. Depending on the second material used, the modified surface properties provided by the surface coating 446 may, for example, allow the organic material monolayer and/or the layer of graphene (not shown) to better adhere to the substrate, or may for example allow the layer of graphene to be more easily removed from the substrate.

Figure 7:
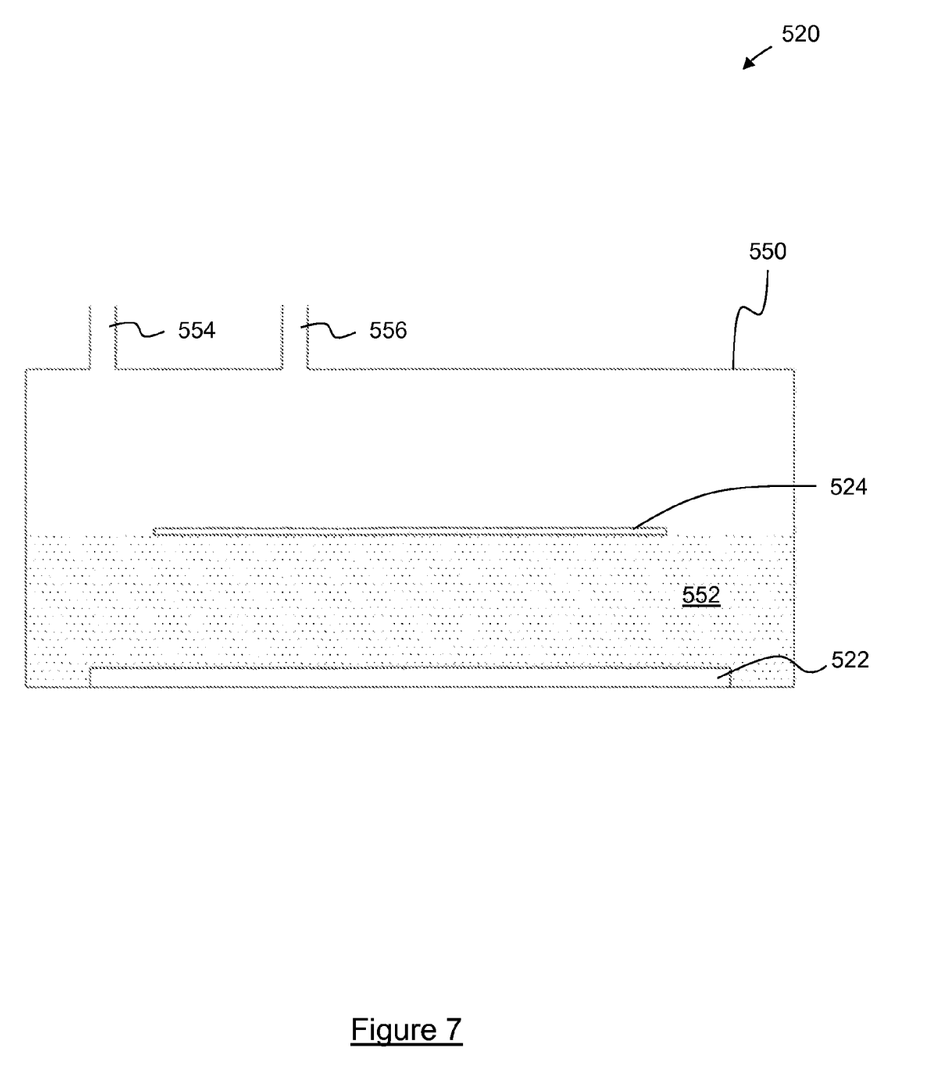
FIG. 7 is a schematic side view of a portion of another embodiment of an apparatus for fabricating graphene.

Other configurations are possible. For example, FIG. 7 shows a portion of another embodiment of an apparatus for forming graphene, generally indicated by reference numeral 520. Apparatus 520 comprises a vessel 550 that is configured for containing a liquid volume 552. The vessel 550 comprises an input port 554 for introducing one or more fluids into the vessel 550, an output port 556 for removing one or more fluids from the vessel 550, and a drain port (not shown) for draining the liquid volume 552 from the vessel 550. The liquid volume 552 contained within the vessel 550 comprises a liquid that is capable of a supporting an organic material monolayer 524 on its surface, such that the organic material monolayer 524 floats on the surface of the liquid volume 552. The apparatus 520 also comprises a substrate 522 supported on an inner surface of the vessel 550 and submerged in the liquid volume 552. The substrate 522 is identical to the substrate 22 described above and with reference to FIGS. 1 and 2.

The apparatus 520 further comprises an energy source (not shown) that is positioned outside of the vessel 550, and is configured to supply sufficient energy to the organic material monolayer 524 floating on the liquid volume 552, for carbonizing at least a portion of the organic material monolayer 524 so as to form a graphene layer. In this embodiment, the energy source is similar to the energy source 26 described above and with reference to FIGS. 1 and 2, and is configured to provide spatially localized energy in the form of an energy beam. In this embodiment, the vessel 550 further comprises a transparent portion (not shown) that is at least partially transparent to the energy supplied by the energy source, so as to allow transmission of at least a portion of the energy beam.

Similar to the energy source 26 described above and with reference to FIGS. 1 and 2, in this embodiment the energy source is coupled to a movement controller (not shown) that is in communication with a general purpose computing device (not shown). The general purpose computing device is configured to operate the movement controller according to a program stored in memory thereof, in order to scan the energy beam through the transparent portion and over the organic material monolayer floating on the liquid volume to form the graphene layer. The stored program comprises a pattern and, due to the localized nature of the energy beam, movement of the energy beam over the organic material monolayer in accordance with the program forms a graphene layer having a pattern corresponding with the pattern of the stored program.

Once the graphene layer has been formed, the liquid volume 552 may be drained through the drain port, so as to transfer the graphene layer from the surface of the liquid volume 552 to the substrate 522.

Although in the embodiment described above, the energy source is positioned outside of the vessel, in other embodiments, the energy source may alternatively be positioned inside the vessel.

Figure 8:
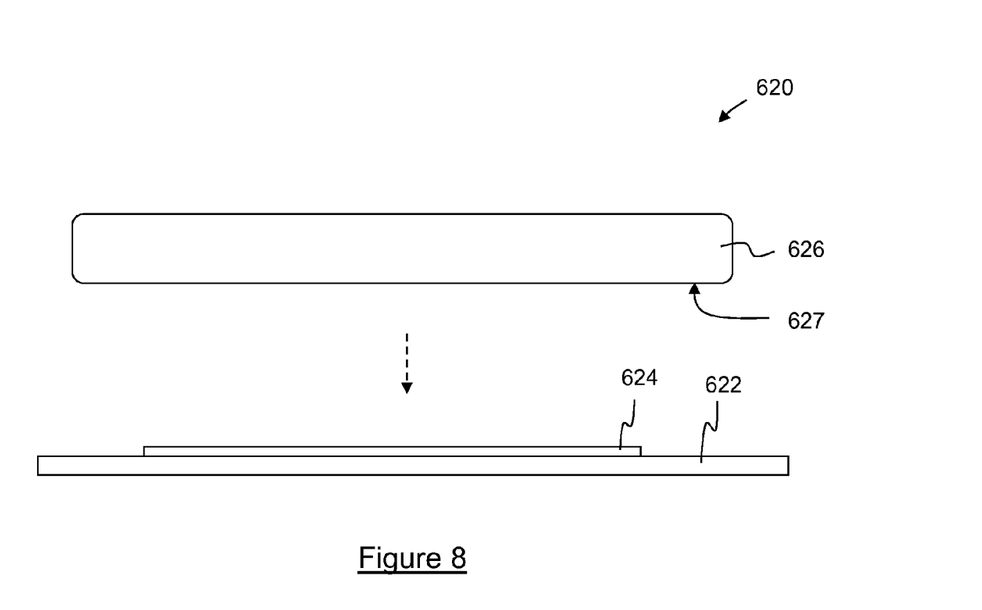
FIG. 8 is a schematic side view of a portion of another embodiment of an apparatus for fabricating graphene.
Figure 9:
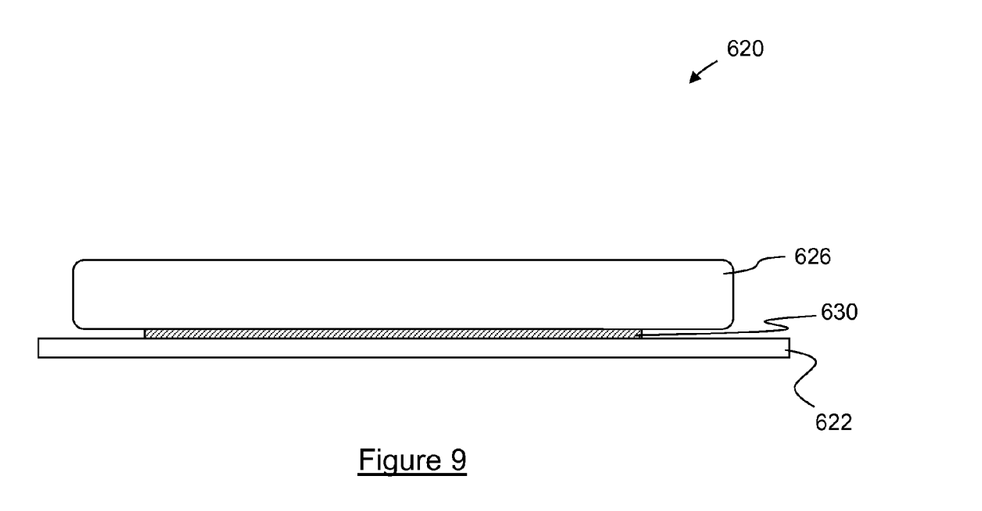
FIG. 9 is a schematic side view of the portion of the apparatus of FIG. 8, during use.

Still other configurations are possible. For example, FIGS. 8 and 9 show a portion of another embodiment of an apparatus for forming graphene, and which is generally indicated by reference numeral 620. Apparatus 620 comprises a substrate 622 on which an organic material monolayer 624 is disposed. The substrate 622 is identical to the substrate 22 described above and with reference to FIGS. 1 and 2, and has a generally planar shape and is in the form of a plate.

The apparatus 620 further comprises an energy source 626 having a heated surface 627. The heated surface 627 is configured to be brought into contact with the organic material monolayer 624 to supply sufficient thermal energy to the organic material monolayer 624 by conduction, so as to carbonize at least a portion of the organic material monolayer 624 so as to form a graphene layer 630. As will be understood, in this embodiment, carbonization of the organic material monolayer 624 results from exposure through contact with a hot surface, and namely the heated surface 627. In this embodiment, the energy source 626 is in the form of a hot plate, and is moveable such that the heated surface 627 can be brought into contact with the organic material monolayer 624.

Although in the embodiment described above, the energy source is moveable such that the heated surface can be brought into contact with the organic material monolayer, in other embodiments, the substrate on which the organic material monolayer is disposed may alternatively be moveable, so as to bring the organic material monolayer into contact with the heated surface. In still other embodiments, both the energy source and the substrate may alternatively be moveable, such that the heated surface and the organic material monolayer can be brought into contact with each other.

Figure 10:
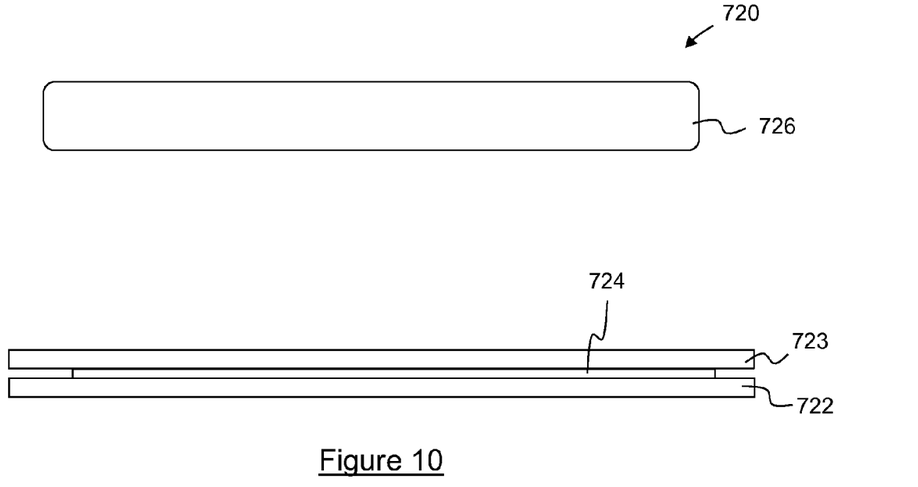
FIG. 10 is a schematic side view of a portion of still another embodiment of an apparatus for fabricating graphene.
Figure 11:
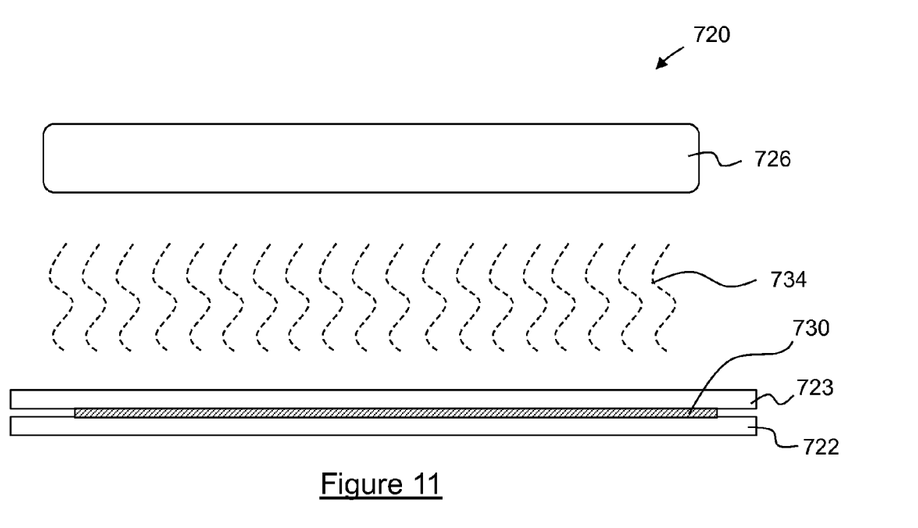
FIG. 11 is a schematic side view of the portion of the apparatus of FIG. 10, during use.

FIGS. 10 and 11 show a portion of another embodiment of an apparatus for forming graphene, and which is generally indicated by reference numeral 720. Apparatus 720 comprises a first substrate 722 and a second substrate 723, between which an organic material monolayer 724 is disposed in a sandwich configuration. Each of the substrates 722 and 723 has a generally planar shape and is in the form of a thin metal foil.

The apparatus 720 further comprises an energy source 726 that is configured to supply thermal energy to the substrates 722 and 723, so as to cause the substrates 722 and 723 to be heated. In turn, the heated substrates 722 and 723 supply sufficient thermal energy to at least a portion of the organic material monolayer 724 by conduction, so as to carbonize at least a portion of the organic material monolayer 724 so as to form a graphene layer 730. As will be understood, in this embodiment, carbonization of the organic material monolayer 724 results from exposure through contact with hot surfaces, and namely the surfaces of the heated substrates 722 and 723 between which the organic material monolayer 724 is disposed. In this embodiment, the energy source 726 is a heating element of a heated chamber, such as for example an oven, a furnace, or a kiln, etc.

Although in the embodiment described above, the energy source is a heating element, in other embodiments, the energy source may alternatively be another suitable source of thermal energy, such as for example a flame.

Although in the embodiment described above, the energy source is configured to supply thermal energy to the substrates, in other embodiments, another energy source may alternatively be used. For example, in one embodiment, the energy source may alternatively comprise a heated surface, and may be configured to be brought into contact with either the first substrate or the second substrate, so as to cause the contacted substrate to be heated via the heated surface. In one such embodiment, the energy source may be a hot plate, for example. In a related embodiment, the apparatus may alternatively comprise two energy sources, with each energy source having a heated surface, and with each energy source being configured to be brought into contact with a respective one of the first substrate and the second substrate, and simultaneously with the other energy source, so as to simultaneously cause each contacted substrate to be heated via the heated surfaces.

Although in the embodiment described above, each of the first substrate and the second substrate has a generally planar shape and is in the form of a thin metal foil, in other embodiments, either the first substrate, the second substrate, or both, may alternatively have a surface having a surface topography formed thereon, such that during heating, only a portion of the organic material monolayer in contact with a corresponding portion of the topography is carbonized.

Although embodiments have been described above with reference to the accompanying drawings, those of skill in the art will appreciate that variations and modifications may be made without departing from the scope thereof as defined by the appended claims.

What is claimed is:

1. A method of forming graphene, comprising:
   supplying energy to at least a portion of an organic material monolayer disposed on a substrate, said energy being sufficient to carbonize the at least a portion of said monolayer exposed thereto to form a layer of graphene on said substrate,
   wherein said substrate comprises a plate, and
   wherein said plate comprises at least one internal conduit for conducting fluid therethrough for any of heating and cooling said plate.

2. The method of claim 1, wherein said energy is a localized beam of energy.

3. The method of claim 2, wherein said localized beam of energy is any of a laser beam, a maser beam, and an electron beam.

4. The method of claim 2, further comprising:
   moving said localized beam over said organic material monolayer in accordance with a pattern.

5. The method of claim 1, wherein said plate comprises a planar surface.

6. The method of claim 1, wherein said plate comprises a surface having a non-planar topography formed by one or more of etching and deposition.

7. The method of claim 1, wherein said plate has a surface coating for modifying surface properties of said substrate, said organic material monolayer being disposed on said surface coating.

8. The method of claim 1, wherein said organic material monolayer is in either a solid state or a liquid state.

9. The method of claim 1, wherein said organic material monolayer further comprises a dopant, and wherein said supplying comprises forming a layer of doped graphene on said substrate.

10. The method of claim 1, further comprising one or more of:
    (i) cooling said substrate during said supplying, and
    (ii) placing said substrate in an environment having an elevated atmospheric pressure,
    to reduce evaporation of said organic material monolayer during carbonization.

11. The method of claim 10, further comprising a combination of cooling said substrate and placing said substrate in said environment having said elevated atmospheric pressure during said supplying.

12. The method of claim 1, further comprising, after said supplying, removing an uncarbonized portion of said organic material monolayer.

13. A method of forming graphene, comprising:
    supplying energy to at least a portion of an organic material monolayer disposed on a substrate, said energy being sufficient to carbonize the at least a portion of said monolayer exposed thereto to form a layer of graphene on said substrate,
    wherein said energy is thermal energy supplied by a hot plate, or by a heating element of any of a furnace, a kiln, and an oven, and
    wherein said substrate is a first substrate, said organic material monolayer being arranged in a sandwich configuration between said first substrate and a second substrate.

* * * * *